Dec. 8, 1925.                                                    1,564,636
                            M. J. SMITH
                      TRAMMEL FOR CUTTING TORCHES
                        Filed May 16, 1925
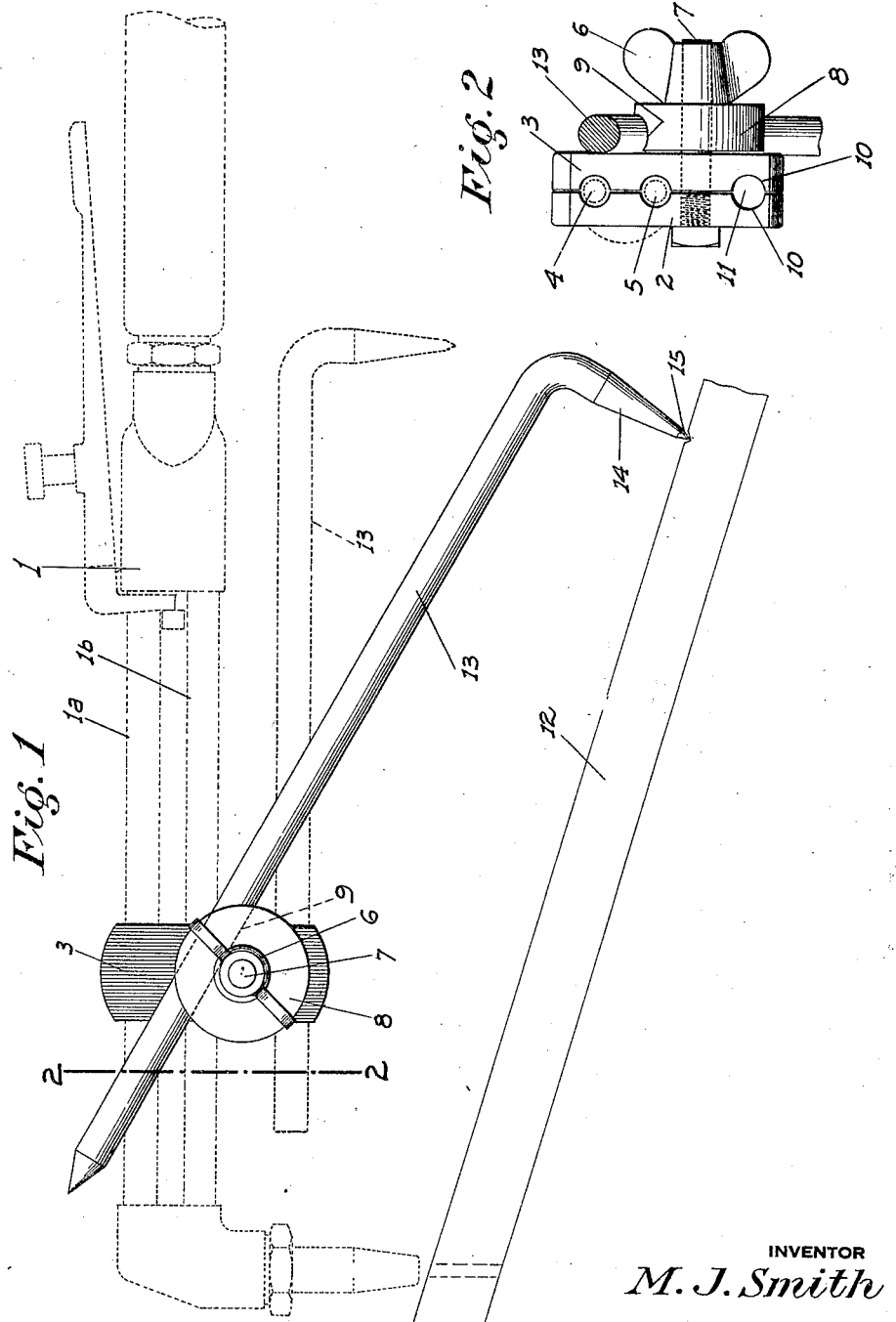
INVENTOR
*M. J. Smith*

Patented Dec. 8, 1925.

1,564,636

UNITED STATES PATENT OFFICE.

MARSTON J. SMITH, OF STOCKTON, CALIFORNIA.

TRAMMEL FOR CUTTING TORCHES.

Application filed May 16, 1925. Serial No. 30,728.

*To all whom it may concern:*

Be it known that I, MARSTON J. SMITH, a citizen of the United States, residing at Stockton, county of San Joaquin, State of California, have invented certain new and useful Improvements in Trammels for Cutting Torches; and I do declare the following to be a full, clear, and exact description of the same, reference being had to the accompanying drawings, and to the characters of reference marked thereon, which form a part of this application.

This invention relates to improvements in the welding art, and particularly to welding torches.

The object of the invention is to produce a trammel attachment for cutting torches whereby welding and metal cutting with the torch can be done in a perfect circle or in any desired arc of a circle and at different angles with dispatch and accuracy.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of a cutting torch showing my improved trammel attachment thereon, and featuring how it can be used in cutting a piece of sheet metal at an angle.

Fig. 2 is an end elevation of the attachment itself.

Referring now more particularly to the characters of reference on the drawings, the numeral 1 designates the cutting torch, which may be of standard construction. The torch in the form shown in the drawings is of that type having two parallel pipes, 1ª and 1ᵇ. My improved attachment comprises two separate clamp members in the form of blocks 2 and 3 adapted for attachment to the torch, as for instance in the type shown in the drawing, there is provided two openings, 4 and 5, to enclose the pipes 1ª and 1ᵇ, whereby the attachment will be firmly secured to the torch when the clamp members 2 and 3 are drawn together by the wing nut 6 mounted on a bolt or pin 7 connecting the members 2 and 3.

The said pin 7 projects for a distance beyond the side of the member 3 and freely turnable thereon is a collar 8 having a transversely disposed slot 9 in that side which faces the adjacent clamp member 3. The outer face of said member 3, flat throughout so as to form a firm and continuous bearing for one edge of the trammel or centering rod hereinafter described.

The members 2 and 3 on their free ends are provided with inner semi-circular slots 10 to form an orifice 11. It is necessary that the torch clamping device be made in the form of two independent blocks as shown, in order to enable it to be applied to the torch without disassembling any part of the latter. This is because the handle of the torch is at one end of the pipes 1ª and 1ᵇ, and the nozzle or head is at the other. This construction, which is standard, prevents the clamping elements from being slipped onto the pipes from either end.

When the torch 1 is to be used for making a circular cut in the metal 12, the edges of which shall be at an acute or an obtuse angle to the surface of such metal, the wing nut 6 is loosened and the collar 8 is turned to the proper position relative to the torch. The rod 13 having the right angle bend 14 is then projected through the slot 9 a distance necessary to fix the center for the cut and the wing nut 6 is then tightened to set the rod in the proper position. The point 15 on the end 14 is then set into the metal for the center of the cut to be made, and this then becomes the pivot on which the torch will be revolved in making the cut.

If a cut is to be made at right angles to the surface of the metal the rod 13, instead of being projected into the slot 9, will be projected through the hole 11 and the wing nut then tightened and when the point 15 is then set into the metal it will hold the torch at right angles thereto with the result that the circular cut made will be at right angles to the surface of the metal.

The depth of the slot 9 is slightly less than the diameter of the rod 13, so that the latter will be pinched against the member 3 when the wing nut is tightened up. Similarly, the combined width of the slots 10 is less than the diameter of the rod, to enable the latter to be clamped between the parts 2 and 3.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A trammel mechanism for cutting torches comprising a clamp block for attachment to a torch, one face of the block being flat, a collar turnably mounted on the block and having a transverse slot in the face thereof adjacent said block, and a centering rod to fit the slot and of a diameter greater than the depth of the slot whereby said rod will bear against the adjacent faces of the block; there being means between the collar and block for clamping the rod therebetween.

2. A trammel mechanism for cutting torches comprising independent clamping blocks having coinciding slots in their adjacent faces for surrounding and engaging a torch element, and having also coinciding slots in their adjacent faces beyond the first named slots to receive a centering rod, and clamping means applied to the blocks for drawing the same together.

3. A trammel mechanism for cutting torches comprising independent clamping blocks having coinciding slots in their adjacent faces for surrounding and engaging a torch element, means for uniting and drawing the blocks together to cause them to be clamped about said element, and means mounted on one block for holding a centering rod.

In testimony whereof I affix my signature.

MARSTON J. SMITH.